United States Patent [19]
DeBoer

[11] Patent Number: 5,119,884
[45] Date of Patent: Jun. 9, 1992

[54] MULTIPLE STAGE ELECTRONIC TEMPERATURE CONTROL FOR HEATING AND COOLING

[75] Inventor: David P. DeBoer, Elkhart, Ind.

[73] Assignee: Johnson Service Company, Milwaukee, Wis.

[21] Appl. No.: 443,900

[22] Filed: Nov. 30, 1989

[51] Int. Cl.$^5$ .................. F25B 29/00; G05D 23/20
[52] U.S. Cl. ........................ 165/2; 165/26; 165/27; 236/1 C; 236/1 E; 236/1 EA; 236/1 EB; 62/175
[58] Field of Search ............ 165/26, 27, 2; 236/1 C, 236/1 EA, 1 EB, 1 E; 62/175

[56] References Cited

U.S. PATENT DOCUMENTS

| | | | |
|---|---|---|---|
| 3,500,898 | 3/1970 | Gerhart, Jr. et al. | 165/26 |
| 3,623,545 | 11/1971 | Pinckaers | 165/26 |
| 3,797,560 | 3/1974 | Zaharoni | 165/26 |
| 3,844,475 | 10/1974 | Kesterson et al. | 165/26 |
| 4,313,560 | 2/1982 | Stiles | 165/22 |

FOREIGN PATENT DOCUMENTS

| | | | |
|---|---|---|---|
| 0143643 | 7/1986 | Japan | 165/26 |
| 0077543 | 4/1987 | Japan | 165/26 |

OTHER PUBLICATIONS

Honeywell, Inc., Honeywell Solid State Remote Temperature Controller T7075A,B. Dec. 1986, Form No. 63-2145, pp. 1-12.

Independent Energy, Inc., Goldline SP-302 Series, Two Stage Temperature Control, PN 222021 Rev D, pp. 1-6, Dec. 1986.

Primary Examiner—John K. Ford
Attorney, Agent, or Firm—Foley & Lardner

[57] ABSTRACT

A control device for energizing and de-energizing temperature changing devices having a primary control unit and a secondary control unit is provided. The primary control unit includes means for sensing an external temperature and generating a signal (Ps) having a value proportional to the external temperature, means for generating a set point signal (Psp), representing one end of a predetermined primary temperature range, and means for generating a differential signal (Pd), representing the difference between signal Psp and the other end of the predetermined primary temperature range are included. Additionally, the primary unit includes a primary switch for connecting power to at least one temperature changing device which is opened and closed in response to combinations of signals Ps, Psp and Pd. The secondary unit includes means for generating an offset signal (So) and means for generating a secondary set point signal (Ssp) having a value proportional to a combination of signal Psp and signal So, and representing one end of a predetermined secondary temperature range. The secondary unit further includes means for generating a secondary differential signal (Sd) representing the difference between signal Ssp and the other end of the predetermined secondary temperature range.

10 Claims, 5 Drawing Sheets

MULTIPLE STAGE ELECTRONIC TEMPERATURE CONTROL FOR HEATING AND COOLING

BACKGROUND OF THE INVENTION

1. Field of the Invention

The present invention relates to an electronic control device for temperature control and more particularly to an electric control device for multiple stage heating and/or cooling.

2. Description of the Prior Art

In cooling or heating large areas, a heating or cooling system i.e., temperature control system, must necessarily have a capacity sufficiently large to accomplish the desired temperature change. However, as the temperature approaches the predetermined desired temperature, the large system capacity may be unable to cease its heating or cooling effect in sufficient time to prevent the temperature of the area from overshooting the desired temperature. Thus, it is desirable to reduce capacity as the temperature approaches the desired temperature.

One method of reducing the capacity of a control system is to literally turn off components thereof. For example, a large cooling unit may have two compressors, and by turning one compressor off, the capacity is reduced. Thus, a temperature control system might have a first stage which turns on and off a first compressor, and a second stage which turns on and off a second compressor. Alternatively, a system might have two separate cooling devices which are turned on and off by the two stages.

Some applications of temperature control systems require that if the temperature of the controlled area is above a desired temperature, a cooling unit of the system is turned on, and that if the temperature is below a desired temperature, a heating unit of the system is turned on. For systems having large capacities, multi-stage heating and cooling units are required.

Typical temperature control systems generally comprise one or two stages, with the staging sequence controlled by complex circuitry. For example, when both stages of a two stage system are selected for heating, or are selected for cooling, stage two deactivation precedes stage one deactivation. When one stage is selected for heating and the other for cooling, one stage is disabled when the other is on. Due to the complex circuitry used to implement the staging operation and sequence of multistage systems, it becomes increasingly difficult to add additional stages and necessitates selling the device as a unit. Furthermore, prior art devices do not have the capability of starting with a single stage and adding a second stage if the need later arises.

In many applications for temperature control systems it is desirable to deactivate the subsequent (secondary) stages at temperatures offset from the temperature selected in the first (primary) stage. For example, in a control system having four stages, in which stages 1 and 2 heat, and stages 3 and 4 cool, the desired temperature is selected in stage 1. Stage 2, the second heating stage, might be selected to turn off at a number of degrees before stage 1 to prevent overshoot. Similarly, the cooling stages would also be turned off at temperatures relative to stage 1. By using offset temperatures, if the desired temperature, defined by the primary stage deactivation temperature, is changed, the temperatures at which the secondary stages deactivate are also changed, thereby insuring that overshoot will not occur.

Prior art devices typically provide each stage with a desired temperature range (hysteresis) defined by start and stop temperatures. The temperature range helps insure that the heating or cooling device does not cycle rapidly on and off about the specific level of the desired temperature.

A desirable electronic temperature control device would have a primary set point as the start or stop temperature, and be able to provide that temperature to secondary stages. The secondary stages would combine the primary set point with a secondary offset to produce a secondary set point (stop temperature) and the staging sequence should be dependent only on the selected set point temperatures. Each primary stage would be capable of driving more than one secondary stage. Furthermore, each stage should be disposed within an individual module, to facilitate the addition of stages.

SUMMARY OF THE INVENTION

A control device for energizing and de-energizing temperature changing devices having a primary control unit and a secondary control unit is provided. The primary control unit includes means for sensing an external temperature and generating a signal (Ps) having a value proportional to the external temperature, means for generating a set point signal (Psp), representing one end of a predetermined primary temperature range, and means for generating a differential signal (Pd), representing the difference between signal Psp and the other end of the predetermined primary temperature range are included. Additionally, the primary unit includes a primary switch for connecting power to at least one temperature changing device which is opened and closed in response to combinations of signals Ps, Psp and Pd. The secondary unit includes means for generating an offset signal (So) and means for generating a secondary set point signal (Ssp) having a value proportional to a combination of signal Psp and signal So, and representing one end of a predetermined secondary temperature range. The secondary unit further includes means for generating a secondary differential signal (Sd) representing the difference between signal Ssp and the other end of the predetermined secondary temperature range. Additionally, the secondary unit includes a secondary switch for connecting power to a temperature changing device which is opened and closed in response to combinations of signals Ps, Ssp and Sd.

BRIEF DESCRIPTION OF THE PREFERRED EMBODIMENT

Figure 1:
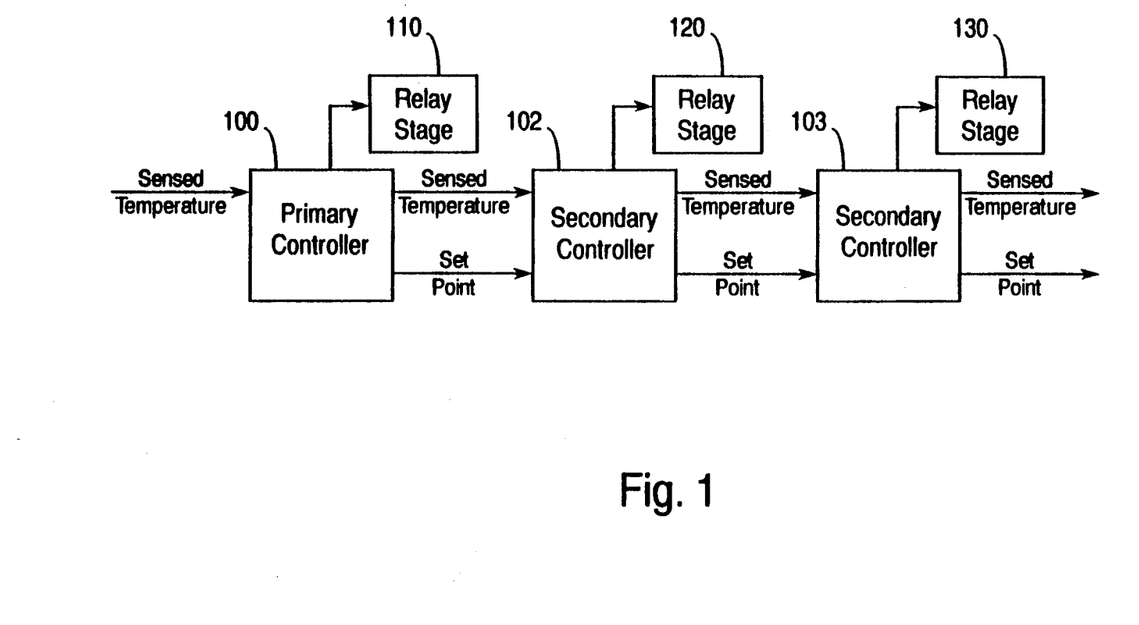
FIG. 1 is a block diagram of an electronic temperature control device in accordance with the preferred exemplary embodiment of the present invention.

An embodiment of the present invention, depicted by the block diagram of FIG. 1, comprises a primary controller 100, a secondary controller 102, a secondary controller 103, a relay stage 110, a relay stage 120 and a relay stage 130. A signal (Ps) representing the sensed temperature is provided to primary controller 100. A user selected temperature range is defined by a set point temperature and a differential temperature, and a signal representing the primary set point temperature (Psp) and a signal representing the primary differential temperature (Pd) are generated within primary controller 100. Primary controller 100 provides a two state signal (Pr) to relay stage 110. When signal Pr is HIGH, relay stage 110 is activated, and when signal Pr is LOW relay stage 110 is de-activated. When relay stage 110 is activated an associated temperature changing device is on, and when relay stage 110 is de-activated the associated temperature changing device is off.

Primary controller 100 changes the state of signal Pr in response to the mode selected (heating or cooling), the sensed temperature and the user selected temperature. When heating is selected, if the sensed temperature falls below the range of temperatures selected by the user signal Ps falls below the range defined by signals Psp and Pd, and then signal Pr is changed to (or maintained at) HIGH. If the sensed temperature rises above the range of temperatures selected by the user signal Ps rises above the range defined by signals Psp and Pd, and then signal Pr is changed to (or maintained at) LOW.

The reverse is true when cooling is selected. If the sensed temperature falls below the range of temperatures selected by the user, signal Ps falls below the range defined by signals Psp and Pd, and then signal Pr is changed to (or maintained at) LOW. If the sensed temperature rises above the range of temperatures selected by the user, signal Ps rises above the range defined by signals Psp and Pd, and then signal Pr is changed to (or maintained at) HIGH.

Primary controller 100 provides the signals Ps and Psp to secondary controller 102. Signals representing user selected secondary offset (So) and differential (Sd) temperatures are provided within secondary controller 102. Secondary controller 102 combines the signals Psp and So offset temperature to produce a secondary set point signal (Ssp). When signal Ps falls below the range defined by signals Ssp and Sd, a signal Sr (which is provided to relay stage 120) is changed to (or maintained at) HIGH when heating is selected and LOW when cooling is selected. When signal Ps rises above the range defined by signals Ssp and Sd, signal Sr is changed to (or maintained at) LOW when heating is selected and HIGH when cooling is selected.

Secondary controller 102 provides the signals Ps and Psp to secondary controller 103. As in secondary controller 102, signals representing a user selected secondary offset temperature (So2) and a user selected differential temperature (Sd2) are generated within secondary controller 103, and combined with signal Psp to define a setpoint signal (Ssp2) for secondary controller 103. When signal Ps falls below the range defined by signals Ssp2 and Sd2, a signal Sr2 (which is provided to relay stage 130) is changed to (or maintained at) HIGH when heating is selected and LOW when cooling is selected. When signal Ps rises above the range defined by signals Ssp2 and Sd2, signal Sr2 is changed to (or maintained at) LOW when heating is selected and HIGH when cooling is selected. Secondary controller 103 provides the signals Ps and Psp to other secondary controllers not shown.

Figure 2:
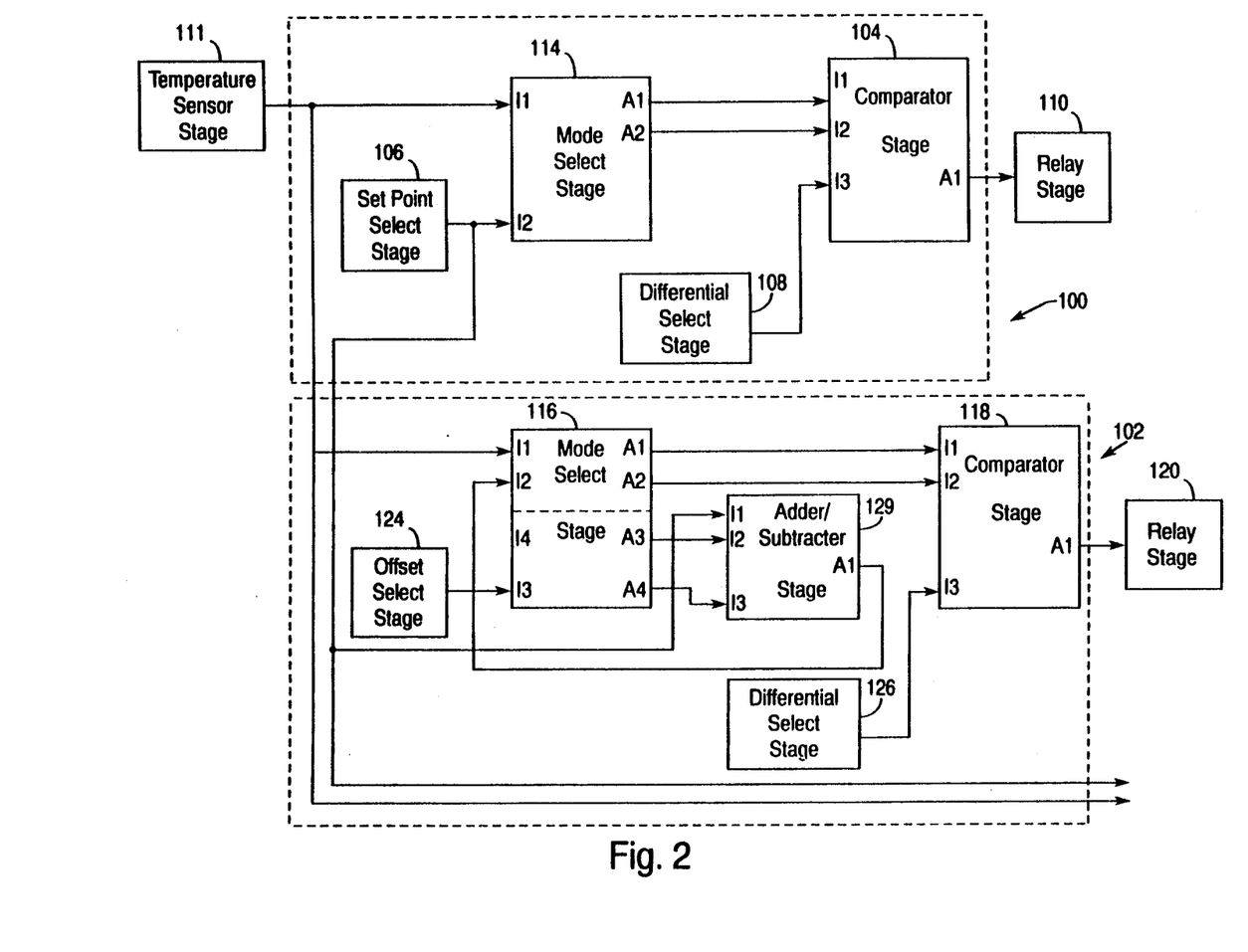
FIG. 2 is a detailed block diagram of a primary stage control and a secondary stage control in accordance with the preferred exemplary embodiment of the present invention.

FIG. 2 shows temperature sensor stage 111, relay stages 110 and 120, primary controller 100 and secondary controller 102 in greater detail. A temperature sensor stage 111 senses the external temperature, generates signal Ps and provides it to primary controller 100. Relay stages 110 and 120 are activated by controllers 100 and 102, respectively. When relay stages 110 and 120 are activated, the associated temperature changing device is turned on.

Primary controller 100 is comprised of a set point select stage 106, a mode select stage 114, a differential select stage 108 and a comparator stage 104. The outputs of temperature sensor stage 111 (signal Ps) and set point select stage 106 (signal Psp) are provided to inputs J1 and J2 of mode select stage 114. Inputs J1 and J2 of mode select stage 114 are connected to outputs B1 and B2, respectively, in the heating mode, and are reversed in the cooling mode. Output B1 of mode select stage 114 is provided to input I1 of comparator stage 104, and output B2 of mode select stage 114 is provided to input N1 of differential select stage 108. Output F1 of differential select stage 108 is provided to input I2 of comparator stage 104. Output A1 of comparator stage 104 is provided to relay stage 110; when output A1 is HIGH, relay stage 110 is activated and when output A1 is LOW, relay stage 110 is deactivated. Output A1 is also provided to input N2 of differential select stage 108.

Output F1 of differential select stage 108 is equal to input N1 (output B2 of mode select stage 114) or input N1 minus the signal (Pd) corresponding to the selected differential temperature, depending on the state of input N2. If input N2 (output A1 of comparator stage 104) is HIGH then output F1 is equal to input N1, and if input N2 is LOW then output F1 is equal to input N1 minus signal Pd. Comparator stage 104 sets output A1 HIGH or LOW depending on inputs I1 and I2. When input I1 is greater than input I2 output A1 is LOW. When input I1 is less than input I2 output A1 is HIGH.

Mode select 114 includes a user operated switch to select the heating or cooling mode. When the heating mode is selected, mode select stage 114 provides signal Ps (input J1 and output B1 of mode select stage 114) to input I1 of comparator stage 104 and signal Psp (input J2 and output B2 of mode select stage 114) to input N1 of differential select stage 108. Therefore, signal Psp is provided to input I2 of comparator stage 104 when output A1 is HIGH, and signal Psp minus signal Pd is provided to input I2 when output A1 is LOW.

According to the operation of differential select stage 108 and comparator stage 104 as detailed above, if output A1 is HIGH, (relay stage 110 is activated) signal Ps (input I1) is compared to signal Psp (output F1 of differential select stage 108 and input I2). As signal Ps (the sensed temperature) becomes greater than signal Psp (the set point temperature) output A1 is changed to LOW, relay stage 110 is deactivated and the heating device is turned off. When A1 is LOW (relay stage 110 is deactivated), signal Ps (input I1) is compared to signal Psp minus signal Pd (input I2). When signal Ps (the sensed temperature) becomes less than signal Psp (the set point temperature) minus signal Pd (the differential temperature) A1 is changed to high, thereby activating relay stage 110 (and turning on the heating device). Thus, it may be seen that differential select stage 108 and comparator stage 104 function as a switch having hysteresis, the width of which corresponds to Pd (the primary differential temperature). In the heating mode the switch is turned off when signal Ps (the sensed temperature) becomes greater than signal Psp (the set point temperature), and is turned on when signal Ps (the sensed temperature) becomes less than signal Psp (the set point temperature) minus signal Pd (the differential temperature).

When the cooling mode is selected, mode select stage 114 provides signal Psp (input J2 and output B1) to input I1 of comparator stage 104 and signal Ps (input J1 and output B2) to input N1 of differential select stage 108. Thus, signal Ps is provided to input I2 of comparator 104 when output A1 is HIGH, and signal Ps minus signal Pd is provided to input I2 when output A1 is LOW.

Differential select stage 108 and comparator stage 104 operate as detailed above, and when output A1 is HIGH (relay stage 110 is activated), signal Psp (input I1) is compared to signal Ps (input I2). When signal Ps (the sensed temperature) decreases below signal Psp (the set point temperature) output A1 is changed to LOW, deactivating relay stage 110 (and the associated cooling device). When output A1 is LOW (relay stage 110 is deactivated), comparator stage 104 compares signal Psp (input I1) to signal Ps minus signal Pd (input I2). When signal Ps (the sensed temperature) minus signal Pd (the primary differential temperature) becomes greater than signal Psp (the primary set point temperature), output A1 is changed to HIGH, activating relay stage 110 and the associated cooling device. Thus, in the cooling mode differential select stage 108 and comparator 104 act as a switch (with hysteresis) which turns on when signal Ps becomes greater than signal Psp plus signal Pd, and turns off when signal Ps becomes less than signal Psp.

Primary controller 100 provides signal Ps and signal Psp to secondary controller 102. Secondary controller 102 is comprised of offset select stage 124, mode select stage 116, adder/subtractor stage 129, differential select stage 126 and comparator stage 118. Secondary controller 102 functions similar to primary controller 100 with the exception that the secondary set point is not selected directly, but rather a secondary offset temperature is selected directly, and a signal representing the secondary offset (So) is combined with signal Psp to produce a secondary set point signal (Ssp).

Mode select stage 116 includes a four pole double throw switch operated by the user to select the heating or cooling mode. The output of offset select stage 124, signal So, is provided to input K4 of mode select stage 116. Input K4 is connected to output C4 in the heating mode and to output C3 in the cooling mode. Outputs C3 and C4 are provided to adder/subtractor stage 129, along with signal Psp. Adder/subtractor stage 129 provides an output D1 (signal Ssp, the secondary set point), and is equal to inputs L1 plus L2 minus L3. Output D1 (signal Ssp) of adder/subtractor stage 129 is provided to input K2 of mode select stage 116.

Signal Ps is provided to input K1 of mode select stage 116. Inputs K1 and K2 of mode select stage 116 are connected to outputs C1 and C2, respectively, in the heating mode, and the connections are reversed in the cooling mode. Output C1 of mode select stage 116 is provided to input M1 of comparator stage 118 and output C2 is provided to input P1 of differential select stage 126. Output G1 of differential select stage 126 is provided to input M2 of comparator stage 118. Output G1 of differential select stage 126 is equal to input P1 (output C2 of mode select stage 116) when input P2 (ouput E1 of comparator stage 118) is HIGH, and is equal to input P1 minus the secondary differential signal (Sd) when input P2 is LOW. Comparator stage 118 functions identically to comparator stage 104.

When the heating mode is selected by mode select stage 116 signal So is provided to input L3 of adder/subtractor stage 129 through input K4 and output C4 of mode select stage 116. Input K3 of mode select stage 116 is connected to zero volts and is provided through output C3 to input L2 of adder/subtractor stage 129. Therefore, output D1 of adder/subtractor stage 129 is equal to signal Psp (input L1) plus zero (input L2) minus signal So (input L3), and is the secondary set point, signal Ssp. Thus, signal So is subtracted from signal Psp in the heating mode, insuring that the secondary stage turns off before (at a lower temperature than) the primary stage. Output D1 of adder/subtractor stage 129 is provided to input K2 of mode select stage 116. In the heating mode, mode select stage 116 provides signal Ps to input M1 of comparator stage 118 and signal Ssp to input P1 of differential select stage 126.

Differential select stage 126 and comparator stage 118 function identically to differential select stage 108 and comparator stage 104, described above, and when output E1 is HIGH (and relay stage 120 is activated) comparator stage 118 compares signal Ps (input M1) to signal Ssp (input M2). When signal Ps (input M1) becomes greater than signal Ssp (input M2), output E1 is changed to LOW, deactivating relay stage 120, and turning the heating device off. When output E1 is LOW comparator stage 118 compares signal Ps (input M1) to signal Ssp minus signal Sd (input M2). When signal Ps becomes less than signal Ssp minus signal Sd output E1 is changed to HIGH, activating relay stage 120 and turning on the heating device.

In the cooling mode, mode select stage 116 provides signal So (input K4) to input L2 of adder/subtractor 129 through output C3. Output D1, of adder/subtractor 129 (signal Ssp), is then equal to signal Psp (input L1) plus signal So (input L2) minus zero volts (input L3) and is provided to input K2 of mode select stage 116. Thus, signal So is added to signal Psp in the cooling mode, insuring that the secondary stage turns off before (at a higher temperature than) the primary stage.

Mode select stage 116 connects input K1 to output C2 and input K2 to output C1 (in the cooling mode). Thus, mode select stage 116 provides signal Ps to input P1 of differential select stage 120, and signal Ssp to input M1 of comparator stage 118. When output E1 is HIGH (relay stage 120 activated), comparator stage 118 compares signal Ssp (input M1) to signal Ps (input M2). When signal Ps becomes less than signal Ssp output E1 is changed to LOW, deactivating relay stage 120 and turning the cooling device off. When output E1 is LOW, comparator stage 118 compares signal Ssp (input M1) to signal Ps minus signal Sd (input M2). When signal Ps minus signal Sd becomes greater than signal Ssp output E1 is changed to HIGH, activating relay stage 120, and turning on the cooling device.

Secondary controller 102 provides signal Ps and signal Psp as outputs to other secondary controllers not shown. The other secondary controllers not shown are configured identically to secondary controller 102. Each secondary controller is provided with its own offset select stage, differential select stage and mode select stage so that each secondary controller may be uniquely configured as a heating or cooling stage with unique offset and differential temperatures.

Primary controller 100 is capable of driving up to five secondary controllers. Thus, it is possible to provide up to six heating and cooling stages (one primary plus five secondary stages) using only one temperature sensor. Each primary and secondary controller is provided with male/female module connectors, as will be described in detail later, to facilitate adding stages.

Figure 3:
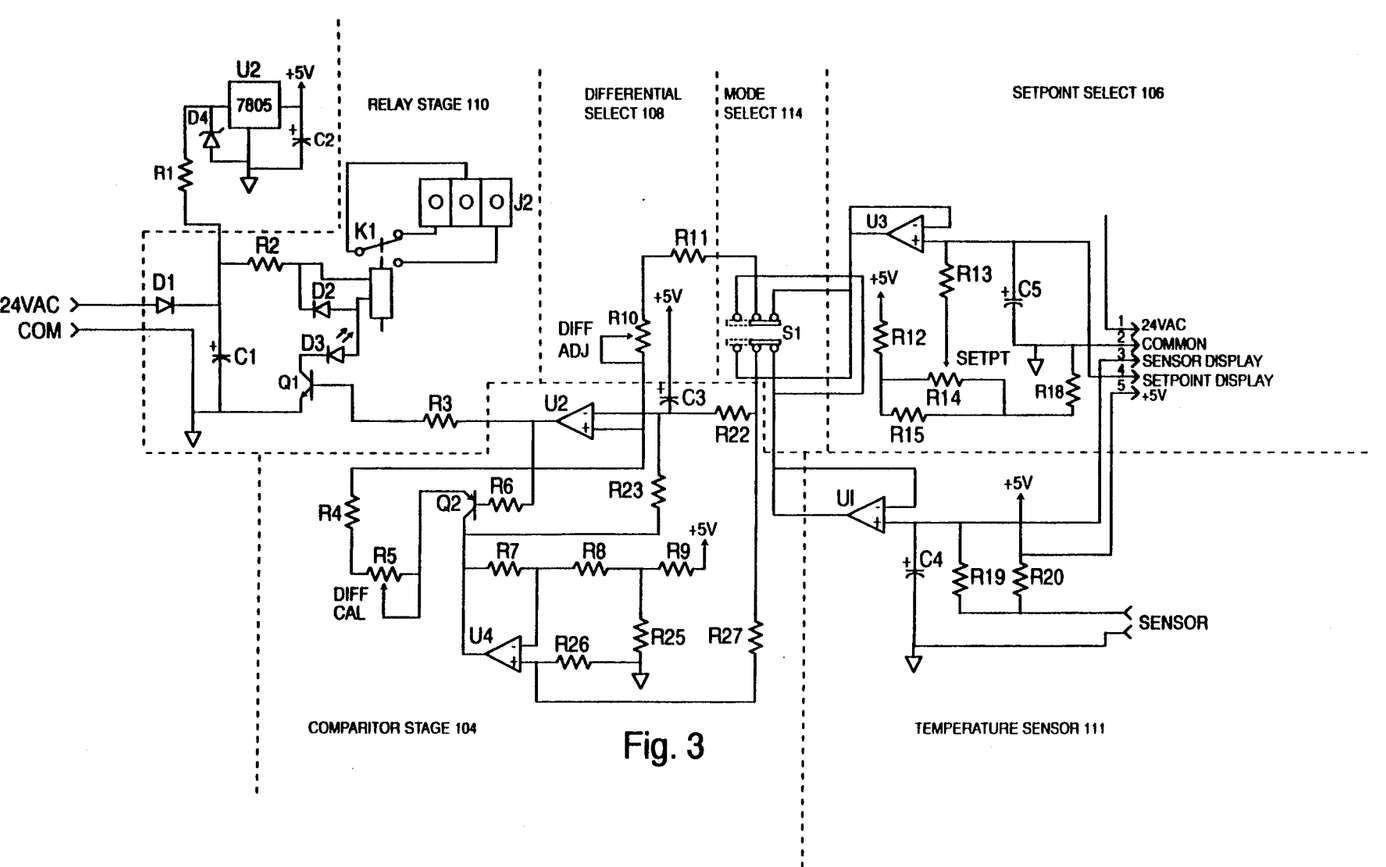
FIG. 3 is a circuit diagram of a primary stage control.

Referring to FIG. 3, a circuit diagram showing relay stage 110, set point select stage 106, mode select stage 114, differential select stage 108, temperature sensor stage 111, and comparator stage 104 of primary controller 100 is provided. Primary controller 100 is provided with a 24 volt AC input, a common or ground input, a temperature sensor input J4 and generates a +5 volt DC signal.

Temperature sensor stage 111 comprises a buffer U1, capacitor C4, and resistors R19 and R20. Resistor R20, suitably 2.32K ohms is connected to the +5 volt DC signal, and cooperates with an external resistive temperature sensor to provide for a 4.4 millivolt per degree Fahrenheit ratio with 0° F. corresponding to 1.202 volts at the input. The external sensor is suitably a positive temperature coefficient (PTC) silicon-based sensor (i.e. as the temperature increases, the resistance of the sensor also increases). Resistor R20 and the sensor form a voltage divider, and as the temperature increases and the resistance of the sensor increases, the voltage at J4 will increase. Negligible current flows through R19 which is connected at one end to the noninverting input of buffer U1, and is suitably a 10K ohm resistor. Thus, the voltage at J4 is applied to the noninverting input of buffer U1, an LM324A op-amp. Capacitor C4, suitably a 10 microfarad capacitor, is connected between the noninverting input of buffer U1 and common to filter out AC signals having a frequency greater than or equal to 60 Hz. Buffer U1, a unity gain buffer, provides an output equal to the noninverting input, i.e., the voltage at the temperature sensor, signal Ps. Signal Ps is provided to a switch S1, part of mode select stage 114.

Set point select stage 106 suitably comprises buffer U3, an LM324A op amp, associated resistors R12, R13, R14, R15 and R18, and capacitor C5. Resistors R12, R14, R15 and R18 form a voltage divider. Resistor R14 is a variable resistor (suitably 10K±5%) adjusted by the user to determine the set point of the primary controller 100. Resistor R12 is suitably a 4.53K ohm resistor connected to the +5 volt DC input, resistor R18 a 1.47K ohm resistor and resistor R15 a 1.24K ohm resistor. Capacitor C5, suitably a 10 microfarad capacitor, is provided to filter out signals having a frequency greater than or equal to 60 Hz. Negligible current flows through resistor R13, suitably 6.65K ohms, and into the noninverting terminal of buffer U3. Thus, the voltage applied to the noninverting input of buffer U3 is readily determined from the values of resistors R12, R14, R15 and R18. As resistor R14 is adjusted by the user, the voltage applied to the noninverting terminal of buffer U3 is adjusted. Buffer U3 is a unity gain buffer having an output, signal Psp, equal to the input at the noninverting terminal.

Switch S1 connects signal Ps and signal Psp to the appropriate inputs of comparator U2. In the heating mode, switch S1 connects signal Ps to the inverting input of comparator U2, and signal Psp to the noninverting input of comparator U2, through differential select stage 108. In the cooling mode switch S1 connects signal Ps to the noninverting input of comparator U2 through differential select stage 108, and signal Psp to the inverting input of comparator U2.

Differential select stage 108 suitably comprises resistors R10 and R11. Resistor R11 is a 1.1K ohm resistor and resistor R10 is a 50K (plus or minus 20%) ohm variable resistor, adjusted by the user to generate the signal representing the differential temperature, signal Pd. Differential select stage 108 is connected to the noninverting input of comparator U2, part of comparator stage 104.

Comparator stage 104 suitably comprises comparator U2 and feedback circuitry; an op-amp U4, a transistor Q2 and resistors R4, R5, R6, R7, R8, R9, R22, R25, R26 and R27. Comparator U2, suitably an LM324A op-amp provides a HIGH output when the noninverting input is greater than the inverting input, and a LOW output when the noninverting input is less than the inverting input.

The feedback circuitry, along with resistors R10 and R11 provide hysteresis corresponding to signal Pd. When the feedback circuitry is enabled, current flows through differential select stage 108 resistors R11 and R10 and through the feedback circuitry. Thus, the voltage at the noninverting input of comparator U2 is equal to the voltage provided to the differential select stage 108 (signal Psp) minus the voltage drop across resistors R10 and R11 (signal Pd). Resistors R4, suitably 86.6K ohms, and R5, suitably 50K±20% ohms, form a voltage divider with resistors R10 and R11. Thus, the resistance of resistors R4 and R5 affects the voltage drop across resistors R10 and R11. Resistor R5 is adjusted during calibration to insure that resistors R10 and R11 provide a 4.4 millivolt per degree Fahrenheit ratio. When the feedback circuitry is disabled, resistors R4 and R5 cannot conduct, therefore there is no voltage divider and the voltage applied to the noninverting input of comparator U2 is equal to the voltage applied to the differential select stage 108 (signal Psp).

The feedback circuitry is enabled when the output of comparator U2 is LOW and is disabled when the output of comparator U2 is HIGH. Resistors R7, R8, R9, R25, R26, R27 and op-amp U4 operate to fix the voltage at the emitter of transistor Q2, a 2N3906 transistor, to be equal to the voltage at the inverting input of comparator U2 minus 0.3 volts. When the output of comparator U2 is LOW, the voltage at the base of transistor Q2 (applied through resistor R6, suitably 30K ohms) is LOW, and transistor Q2 is turned on, enabling the feedback circuitry. Resistors R7, R8, R26 and R27 are suitably 1M ohms. Resistor R9 is suitably 26.1K ohms and resistor R25 is suitably 1.65K ohms. A capacitor C3 and resistor R22 prevent unwanted power on cycling. Capacitor C3 is suitably 47 microfarads and resistor R22 is suitably 10K ohms.

When the output of comparator U2 is HIGH, the voltage at the base of transistor Q2 is HIGH, and transistor Q2 is turned off, disabling the feedback circuitry.

When the output of comparator U2 is HIGH, transistor Q1 is turned ON, thereby activating relay stage 110. When relay stage 110 is activated, the heating or cooling device is on.

In the heating mode switch S1 connects signal Psp to the differential select stage. When the output of comparator U2 is HIGH, (and relay stage 110 activated), the feedback circuit is disabled and signal Psp is applied to the noninverting input of comparator U2. Switch S1 also connects signal Ps to the inverting input of comparator U2. As signal Ps increases, and becomes greater than signal Psp, the output of comparator U2 becomes LOW, deactivating relay stage 110. The LOW output of comparator U2 enables the feedback circuitry, causing current to flow through resistors R4 and R5 of comparator stage 104, thereby causing a voltage drop across resistors R10 and R11. Thus, the voltage at the noninverting input of comparator U2 is reduced by signal Pd. As signal Ps decreases to be less than signal Psp minus signal Pd, the output of comparator U2 becomes HIGH, disabling the feedback and activating relay stage 110.

In the cooling mode switch S1 connects signal Ps to the noninverting input of comparator U2 through differential select stage 108, and signal Psp to the inverting input of comparator U2. When the output of comparator U2 is HIGH (relay stage 110 is activated), the feedback circuitry is disabled and signal Ps is applied to the noninverting input of comparator U2. As signal Ps decreases to be less than signal Psp the output of comparator U2 is changed to LOW, deactivating relay stage 110, and enabling the feedback circuitry. With the feedback circuitry enabled, resistors R4 and R5 conduct current, creating a voltage drop across resistors R10 and R11 and the signal at the noninverting input is reduced by signal Pd. As signal Ps increases such that signal Ps minus signal Pd is greater than signal Psp, the output of comparator U2 becomes HIGH, activating relay stage 110 and disabling the feedback circuitry.

Relay stage 110 comprises switch K1, capacitor C1 (330 microfarads), resistor R2 (270 ohms), diodes D1 and D2, LED D3, transistor Q1, and resistor R3 (30K ohms). Relay stage 110 is activated when a HIGH signal from comparator U2 is applied to the base of transistor Q1, through resistor R3.

The 24-volt AC input is converted to a 5-volt DC signal by resistors R1 (390 ohms), zener diode D4 (20-volt), capacitor C2 (0.1 microfarads), and a 5 volt voltage regulator U5.

Figure 4:
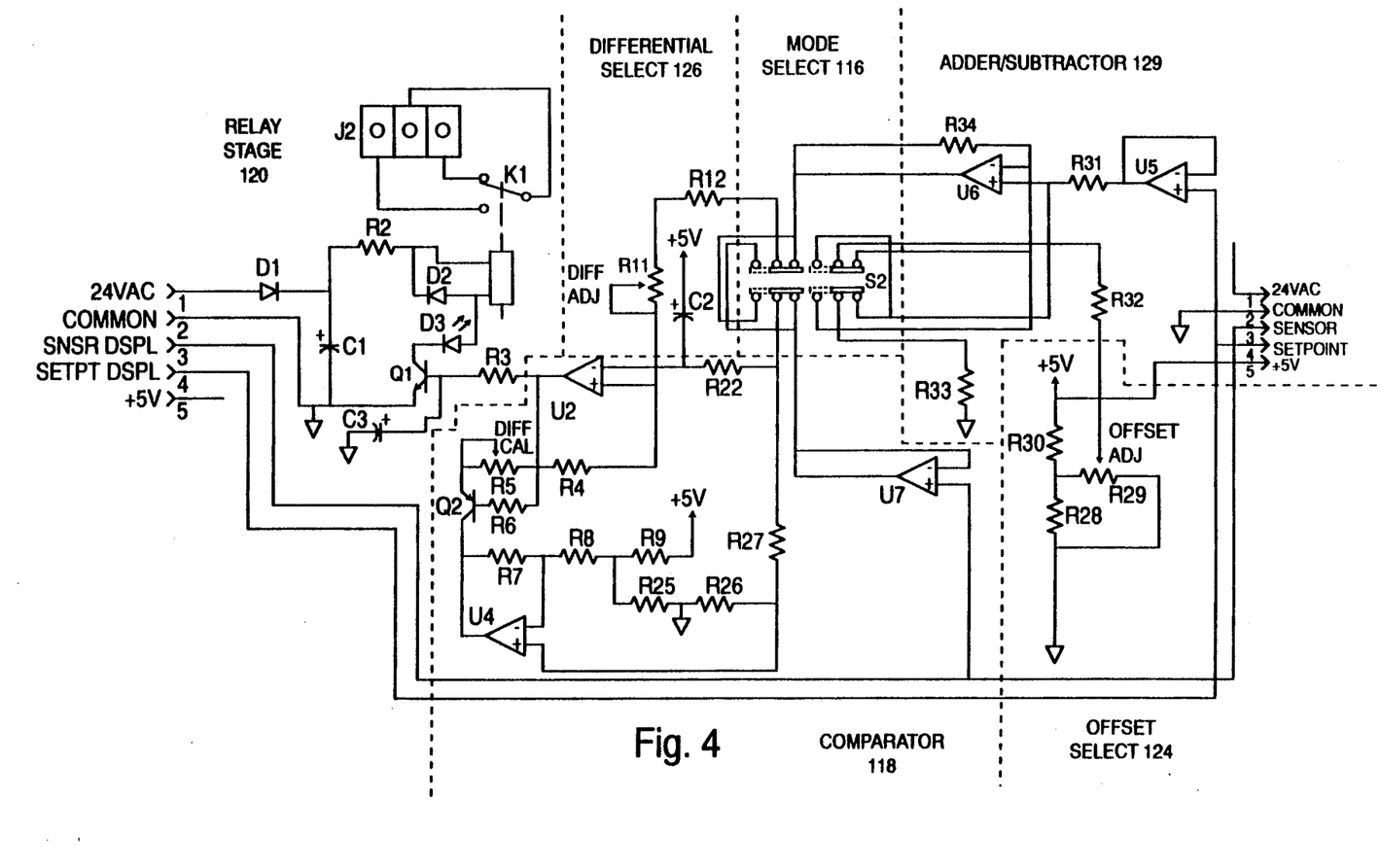
FIG. 4 is a circuit diagram of a secondary stage control.

Referring to FIG. 4 a circuit diagram of relay stage 120, differential select stage 126, mode select stage 116, adder/subtractor stage 129, comparator stage 118 and offset stage 124 of secondary controller 102 are shown. Offset stage 124 suitably comprises voltage divider resistors R28, R29 and R30, suitably 100 ohms, 1K ohm (±20%) and 3.32K ohms, respectively. Resistor R29 is a variable resistor adjusted by the user to select the offset temperature. The output of offset stage 124 (signal So), which is equal to the voltage on the wiper of variable resistor R29, is provided to switch S2, a double-pole double-throw switch of mode select stage 116.

Adder/subtractor stage 129 comprises a buffer U5 for receiving signal Psp from primary controller 100, and difference amplifier U6 having feedback resistors R31, R32, R33 and R34. Difference amplifier U6, having two signals applied to its noninverting input and one to its inverting input, is suitably an LM324A op-amp and resistors R30 through R33 are suitably 100K ohms. For the given values of resistors R30-R33, the output of difference amplifier U6 is equal to the sum of the noninverting inputs minus the inverting input. Signal Psp is one noninverting input of difference amplifier U6. In the heating mode, switch S2 provides zero volts as the second noninverting input through resistor R33 and signal So as the inverting input. Thus, when in the heating mode, the output of difference amplifier U6 (signal Ssp) is equal to signal Psp minus signal So. When in the cooling mode S1 provides signal So as the second noninverting input, and zero volts through resistor R33 as the inverting input. Thus, when cooling is selected, the output of difference amplifier U6 (signal Ssp) is equal to signal Psp plus signal So.

Comparator stage 118 is identical to comparator stage 104 of primary controller 100. Similarly, differential select stage 126 is identical to differential select stage 108 of primary controller 100. Signal Ssp is provided to switch S2, and when in the heating mode is provided to the noninverting input of comparator U2 through differential stage 126. Signal Ps is provided to the inverting input of comparator U2 through buffer U7, an LM324A op amp.

The feedback circuitry, as in comparator stage 104, is disabled when the output of comparator U2 is HIGH, and comparator U2 compares signal Ssp to signal Ps. When signal Ps becomes greater than signal Ssp the output of comparator U2 changes to LOW, and the feedback circuitry is enabled. When the feedback circuitry is enabled, comparator U2 compares signal Ssp minus signal Sd to signal Ps. As signal Ps decreases to less than signal Ssp minus signal Sd, the output of comparator U2 changes to HIGH, and the feedback circuitry is disabled.

When the cooling mode is selected, switch S2 provides signal Ps through differential select stage 126 to the noninverting input of comparator U2 and signal Ssp to the inverting input of comparator U2. When the output of comparator U2 is HIGH (relay stage 120 is activated), the feedback circuitry is disabled and comparator U2 compares signal Ps to signal Ssp. When signal Ps decreases to less than signal Ssp, the output of comparator U2 changes to LOW, deactivating relay stage 120, and enabling the feedback circuitry. With the feedback circuitry enabled, comparator U2 compares signal Ps minus signal Pd to signal Psp. When signal Ps increases such that signal Ps minus signal Pd is greater than signal Ssp, the output of comparator U2 changes to HIGH, activating relay stage 120, and disabling the feedback circuitry.

Relay stage 120, identical to relay stage 120, comprises switch K1, capacitor C1 (330 microfarads), resistor R2 (270 ohms), diodes D1 and D2, LED D3, transistor Q1, and resistor R3 (30K ohms).

Figure 5:
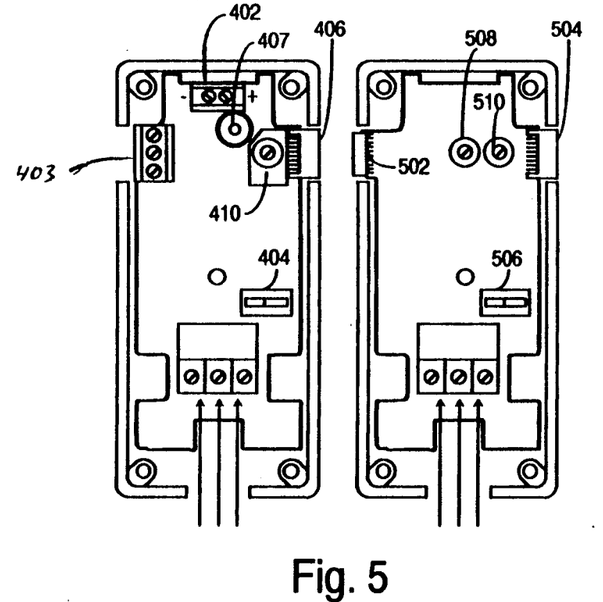
FIG. 5 is a plan view of a primary control unit and secondary control unit.

FIG. 5 is a plan view showing primary controller 100. Primary controller 100 is disposed within a modular structure provided with input terminals 402 for the external temperature sensor and 403 for the voltage inputs, a heating/cooling selector switch 404, differential potentiometer 410 and male output connectors 406. FIG. 5 also shows secondary controller 102 disposed within a modular structure provided with an offset potentiometer 508, a differential potentiometer 510, a heating/cooling selector switch 506, female input connectors 502 and male output connectors 504. Each of connectors 502, 504, and 406 comprise 5 pins for providing a 24 Volt C signal, a 5 Volt DC signal, ground, signal Ps, and signal Psp. Connectors 502 and 504 are suitably high insertion force friction fit connectors. Female connectors 502 (available from MAR Electronics, Indianapolis, In., part #05JQ-ST) are designed to fit into male output connectors 406 (available from MAR Electronics, Indianapolis, In., part #S5B-XH-A1) of primary controller 100 to facilitate attaching secondary controller 102. Male module connector 504 is disposed to interact with a female input connector on an additional secondary controller. Thus, it may be seen that the physical connecting of secondary stages is of relative ease and may be done at a time other than upon purchase.

It should be clear from the foregoing that modifications and changes may be made to the invention without departing from the scope of the claims.

I claim:

1. A control apparatus for energizing and de-energizing temperature changing devices including primary and secondary control units wherein:
   (a) said primary control unit comprises:
       (i) means for sensing an external temperature and generating a sensing temperature signal (Ps) having a value proportional to said external temperature;
       (ii) means for generating a primary set point signal (Psp) having a value representing a temperature level at one end of a predetermined primary temperature range;
       (iii) means for generating a primary temperature differential signal (Pd) having a predetermined value representing the difference between signal Psp and the other end of said primary predetermined temperature range; and
       (iv) primary switch means responsive to a first combination of said signals Ps, Psp and Pd for opening a primary circuit connecting a primary power source to at least one temperature changing device and responsive to a second combination of said signals Ps, Psp and Pd for closing said primary circuit to said one temperature changing device;
   (b) said secondary control unit comprising:
       (i) means for generating an offset signal, So, having a predetermined value;
       (ii) means for generating a secondary set point signal, Ssp, having a value proportional to a combination of said Psp signal and said So signal and representing a temperature level at one end of a predetermined secondary temperature range;
       (iii) means for generating a secondary differential signal (Sd) having a predetermined value representing the difference between said signal Ssp and the other end of said predetermined secondary temperature range; and
       (iv) secondary switch means responsive to a first combination of said signals Ps, Ssp and Sd for opening a secondary circuit connecting a secondary power source to at least one secondary temperature changing device and responsive to a second combination of said signals Ps, Ssp and Sd for closing said secondary circuit to said temperature changing device;
   (c) said control unit further includes a first housing and a second housing wherein:
       (i) said primary control unit is disposed within said first housing;
       (ii) said secondary control unit is disposed within said second housing;
       (iii) said first housing includes a plurality of primary connectors for providing as outputs said signals Ps and Psp;
       (iv) said second housing includes a plurality of first secondary connectors for receiving as inputs said signals Ps and Psp and providing said signals Ps and Psp to said secondary control unit and a plurality of second secondary connectors for providing as outputs said signals Ps and Psp; and
       (v) said primary connectors are disposed to positively engage said first secondary connectors, wherein said primary control unit is in electrical contact with said secondary control unit.

2. The apparatus of claim 1 wherein said primary, first secondary and second secondary connectors are high insertion force friction fit connectors.

3. The control apparatus of claim 1 in which said primary control unit is adapted to be selectively set in one of a heating mode and cooling mode wherein said primary switch means has first and second primary states of operation, wherein;
   (a) said primary switch means, when in said first primary state and when said primary control unit is in a heating mode, changes to said second primary state in response to said signal Ps being greater than said signal Psp, thereby opening said primary circuit; and
   (b) said primary switch means, when in said second primary state and when said primary control unit is in a heating mode, changes to said first primary state in response to said signal Ps being less than the difference between said signal Psp and signal Pd, thereby closing said primary circuit.

4. The control apparatus of claim 3 in which said secondary control unit is adapted to be selectively set in one of a heating mode and a cooling mode wherein said secondary switch means has first and second secondary states of operation, wherein;
   (a) said secondary switch means, when in said first secondary state and when said secondary control unit is in a heating mode, changes to said second secondary state in response to said signal Ps being greater than said signal Ssp, thereby opening said secondary circuit; and
   (b) said secondary switch means, when in said second secondary state and when said secondary control unit is in a heating mode, changes to said first secondary state in response to said signal Ps being less than the difference between said signal Psp and signal Sd, thereby closing said secondary circuit.

5. The control apparatus of claim 1 in which said primary control unit is adapted to be selectively set in one of a heating mode and cooling mode wherein said primary switch means has first and second primary states of operation, wherein;
   (a) said primary switch means, when in said first primary state and when said primary control unit is in a cooling mode, changes to said second primary state in response to said signal Ps being greater than said signal Psp, thereby opening said primary circuit; and
   (b) said primary switch means, when in said second primary state and when said primary control unit is in a cooling mode, changes to said first primary state in response to said signal Ps being greater than the sum of said signal Psp and said signal P, thereby closing said primary circuit.

6. The control apparatus of claim 5 in which said secondary control unit is adapted to be selectively set in one of a heating mode and a cooling mode wherein said secondary switch means has first and second secondary states of operation, wherein;
   (a) said secondary switch means, when in said first secondary state and when said secondary control unit is in a cooling mode, changes to said second secondary state in response to said signal Ps being less than said signal Ssp, thereby opening said secondary circuit; and (b) said secondary switch means, when in said second secondary state and when said secondary control unit is in a cooling mode, changing to said first secondary state in response to said signal Ps being greater than the sum of said signal Ssp and said signal Sd, thereby closing said secondary circuit.

7. A control apparatus for energizing and de-energizing temperature changing devices including a primary and at least one secondary control unit wherein:

(a) said primary control unit comprises:
  (i) means for sensing an external temperature and generating a sensing temperature signal (Ps) having a value proportional to said external temperature;
  (ii) means for generating a primary set point signal (Psp) having a value representing a temperature level at one end of a predetermined primary temperature range;
  (iii) means for generating a primary temperature differential signal (Pd) having a predetermined value representing the difference between signal Psp and the other end of said primary predetermined temperature range;
  (iv) primary switch means responsive to a first combination of said signals Ps, Psp and Pd for opening a primary circuit connecting a primary power source to at least one temperature changing device and responsive to a second combination of said signals Ps, Psp and Pd for closing said primary circuit to said one temperature changing device;
  (v) primary output means for providing said signals Ps and Psp to one of said secondary control units;

(b) said secondary control units comprises:
  (i) means for generating an offset signal, So, having a predetermined value;
  (ii) means for generating a secondary set point signal, Ssp, having a value proportional to a combination of said Psp signal and said So signal and representing a temperature level at one end of a predetermined secondary temperature range;
  (iii) means for generating a secondary differential signal (Sd) having a predetermined value representing the difference between said signal Ssp and the other end of said predetermined secondary temperature range;
  (iv) secondary switch means responsive to a first combination of said signals Ps, Ssp and Sd for opening a secondary circuit connecting a secondary power source to at least one secondary temperature changing device and responsive to a second combination of said signals Ps, Ssp and Sd for closing said secondary circuit to said secondary temperature changing device; and
  (v) secondary input means for receiving said signals Psp and Ps and secondary output means for providing said signals Psp and Ps to one of said secondary control units;

said control unit further includes a primary housing and at least one secondary housing wherein said primary control unit is disposed in said primary housing and each of said secondary control units is disposed in a secondary housing.

8. The apparatus of claim 7 wherein:

(a) said primary housing further includes a plurality of primary connectors, electrically connected to said primary output means;

(b) each of said secondary housing further includes a plurality of secondary output connectors electrically connected to said secondary input means, and a plurality of secondary output connectors electrically connected to said secondary output means;

(c) said primary connectors disposed to positively engage said secondary input connectors, wherein said primary output means is maintained in electrical contact with said secondary input means; and (d) said secondary output connectors disposed to positively engage said secondary input connectors, wherein said secondary output means is maintained in electrical contact with said secondary input means.

9. The apparatus of claim 8 wherein said primary connectors, secondary input connectors and secondary output connectors are high insertion force friction fit connectors.

10. A method for energizing and de-energizing temperature changing devices comprising the steps of:

(a) providing a primary control unit, including the steps of:
  (i) sensing an external temperature and generating a sensing temperature signal (Ps) having a value proportional to said external temperature;
  (ii) generating a primary set point signal (Psp) having a value representing a temperature level at one end of a predetermined primary temperature range;
  (iii) generating a primary temperature differential signal (Pd) having a predetermined value representing the difference between signal Psp and the other end of said primary predetermined temperature range;
  (iv) opening a primary circuit connecting a primary power source to at least one temperature changing device in response to a first combination of said signals Ps, Psp and Pd and closing said primary circuit to said one temperature changing device in response to a second combination of said signals Ps, Psp and Pd; and
  (v) providing said signals Ps and Psp to one of said secondary control units; and (b) providing at least one secondary control unit, including the steps of:
  (i) generating an offset signal, So, having a predetermined value;
  (ii) generating a secondary set point signal, Ssp, having a value proportional to a combination of said Psp signal and said So signal and representing a temperature level at one end of a predetermined secondary temperature range;
  (iii) generating a secondary differential signal (Sd) having a predetermined value representing the difference between said signal Ssp and the other end of said predetermined secondary temperature range;
  a(iv) opening a secondary circuit connecting a secondary power source to act at least one secondary temperature changing device in response to a first combination of said signals Ps, Ssp and Sd and closing said secondary circuit to said secondary temperature changing device responsive to a second combination of said signals Ps, Ssp and Sd; and (v) receiving said signals Psp and Ps and providing said signals Psp and Ps to one of said secondary control units; and providing a primary housing and at least one secondary housing and disposing said primary control unit in said primary housing and disposing each of said secondary control units in a secondary housing.

* * * * *